US008826212B2

(12) United States Patent
Yeh et al.

(10) Patent No.: US 8,826,212 B2
(45) Date of Patent: Sep. 2, 2014

(54) METHOD OF FORMING A LAYOUT INCLUDING CELLS HAVING DIFFERENT THRESHOLD VOLTAGES, A SYSTEM OF IMPLEMENTING AND A LAYOUT FORMED

(71) Applicant: Taiwan Semiconductor Manufacturing Company, Ltd., Hsinchu (TW)

(72) Inventors: Sung-Yen Yeh, Jiadong Township (TW); Yeh-Chi Chang, Hsinchu (TW); Yen-Pin Chen, Taipei (TW); Zhe-Wei Jiang, Hsinchu (TW); King-Ho Tam, Hsinchu (TW); Yuan-Te Hou, Hsinchu (TW); Chung-Hsing Wang, Baoshan Township (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 13/793,515

(22) Filed: Mar. 11, 2013

(65) Prior Publication Data

US 2014/0165020 A1 Jun. 12, 2014

Related U.S. Application Data

(60) Provisional application No. 61/734,357, filed on Dec. 6, 2012.

(51) Int. Cl.
*G06F 17/50* (2006.01)

(52) U.S. Cl.
USPC .............. 716/122; 716/55; 716/118; 716/119

(58) Field of Classification Search
USPC .................................................. 716/118–125
See application file for complete search history.

(56) References Cited

U.S. PATENT DOCUMENTS

| 7,689,946 B2* | 3/2010 | Kim et al. ...................... 716/136 |
| 7,873,929 B2* | 1/2011 | Kahng et al. ................... 716/118 |
| 7,949,988 B2* | 5/2011 | Tsai et al. ....................... 716/139 |
| 8,136,072 B2* | 3/2012 | Frederick ....................... 716/119 |
| 2004/0039997 A1 | 2/2004 | Chiang et al. |
| 2007/0083842 A1* | 4/2007 | Namba et al. .................... 716/17 |
| 2009/0113368 A1* | 4/2009 | Lin et al. ......................... 716/10 |
| 2010/0115484 A1* | 5/2010 | Frederick ........................ 716/10 |
| 2011/0078639 A1* | 3/2011 | Lin et al. ......................... 716/55 |

* cited by examiner

*Primary Examiner* — Nha Nguyen
(74) *Attorney, Agent, or Firm* — Lowe Hauptman & Ham, LLP (57) ABSTRACT

A method including developing a circuit schematic diagram, the circuit schematic diagram including a plurality of cells. The method further includes generating cell placement rules for the plurality of cells based on the circuit schematic diagram and developing a circuit layout diagram for the plurality of cells based on the cell placement rules. The method further includes grouping the plurality of cells of the circuit layout diagram based on threshold voltages and inserting threshold voltage compliant fillers into the circuit layout diagram. A system for implementing the method is described. A layout formed by the method is also described.

20 Claims, 9 Drawing Sheets

METHOD OF FORMING A LAYOUT INCLUDING CELLS HAVING DIFFERENT THRESHOLD VOLTAGES, A SYSTEM OF IMPLEMENTING AND A LAYOUT FORMED

CROSS-REFERENCE TO RELATED APPLICATION

The present application claims the priority of U.S. Provisional Application No. 61/734,357, filed Dec. 6, 2012, the disclosure of which is incorporated by reference herein in its entirety.

BACKGROUND

Integrated circuits often include cells which have different threshold voltages. For example, cells along a critical speed path having a lower threshold voltage than cells along a non-critical speed path. As technology nodes shrink, lithography and doping processes used to form the cells having different threshold voltages becomes more difficult due to reduced spacing between the cells.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

Figure 1:
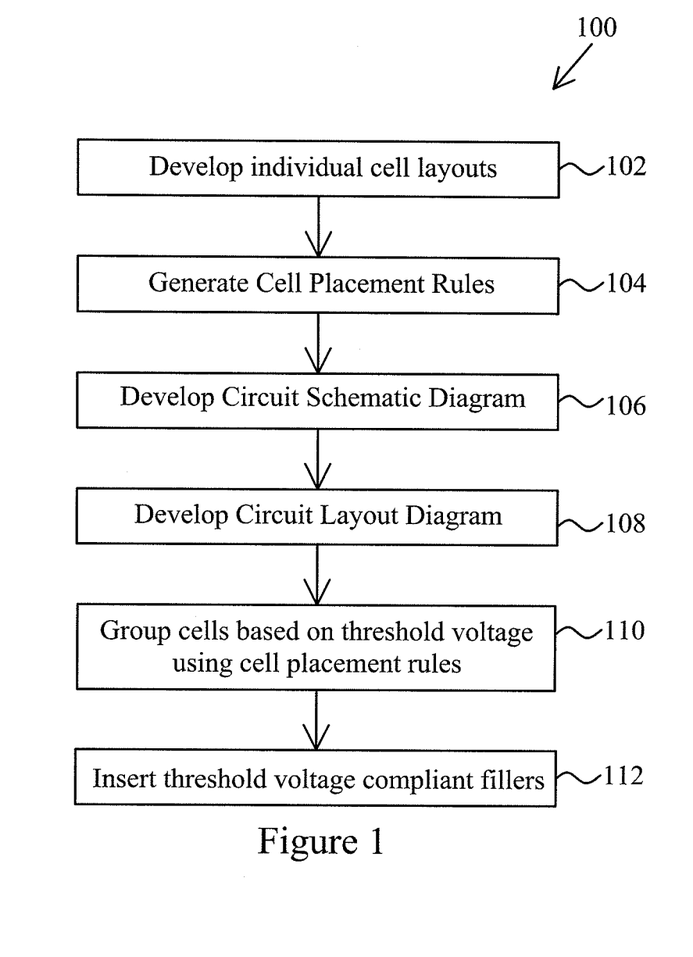
FIG. 1 is a flowchart of a method of forming a layout including cells having different threshold voltages, in accordance with one or more embodiments.

FIG. 1 is a flowchart of a method 100 of forming a layout including cells having different threshold voltages, in accordance with some embodiments. Method 100 includes step 102 in which individual cell layouts are developed. The individual cell layouts include cells configured to perform desired functions. The individual cell layouts also include dimensions, such as feature size. In some embodiments, cells or components of cells have different threshold voltages than other cells or components. A threshold voltage is determined by an area and material of a transistor gate and channel. In some embodiments, a height of the transistor gate is maintained constant for all transistors to simplify a manufacturing process. In some embodiments, the transistor gate height ranges from 0.5 micrometers ($\mu$m) to 1.0 $\mu$m. In some embodiments, the threshold voltage is altered by changing a width of the transistor gate. A lower threshold voltage increases switching speed of transistors, but also increases the current leakage within the cell or component. In some embodiments, the schematic circuit diagram contains cells or components having three or more different threshold voltages. In some embodiments, a difference between threshold voltages is at least 10 millivolts (mV). In some embodiments, a circuit designer designs the individual cell layouts.

In operation 104, cell placement rules are generated. In some embodiments, cell placement rules are performed for each new individual cell layout. In some embodiments, cell placement rules are performed once for each type of cell, e.g., an inverter, and the cell placement rules are saved for use with subsequent cell layouts which include the same type of cell.

Figure 2:
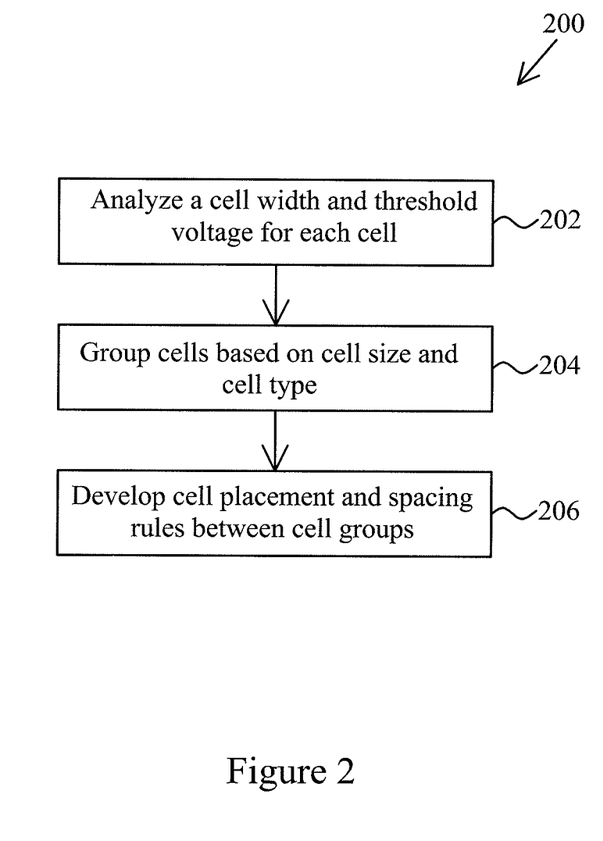
FIG. 2 is a flowchart of a method of generating cell placement rules, in accordance with one or more embodiments.

FIG. 2 is a flowchart of a method 200 for generating cell placement rules, in accordance with one or more embodiments. In operation 202, an analysis of a width of each cell and a threshold voltage of each cell is performed. The width of each cell and the threshold voltage of each cell are determined based on the individual cell layout. The width of each cell is compared with a minimum value. In some embodiments, the minimum value is equal to a smallest feature a lithography process used during manufacturing a circuit is capable of forming. In some embodiments, the minimum value ranges from 100 nanometers (nm) to 500 nm. If a cell has a width larger than or equal in size to the minimum value, the cell is labeled as a large cell. If a cell has a width smaller than the minimum value, the cell is labeled as a small cell.

In operation 204, cells are grouped based on the size of the cells. Cells having a same label, i.e., small cell or large cell, and having a same threshold voltage are grouped together. During the grouping of the cells, the electrical connections between various cells are maintained, so that the circuit functions as designed.

In operation 206, cell placement and spacing rules are developed between cell groups. In some embodiments, the cell placement and spacing rules include having a space adjacent to a small cell and a large cell having a different threshold voltage equal to or greater than the minimum value minus the width of the small cell. In some embodiments, the cell placement and spacing rules include having a space between two small cells having different threshold voltages equal to or greater than twice the minimum value minus the widths of the two small cells. In some embodiments, the cell placement and spacing rules allow for no space, or a space of any dimension, between cells having a same threshold voltage. In some embodiments, the cell placement and spacing rules allow for no space, or a space of any dimension, between adjacent large cells. In some embodiments, these rules are implemented using an automatic placement and routing (APR) tool. The cell widths and threshold voltage and determined in operation 202 and imported into the APR tool to arrange the individual cells to satisfy the placement rules. The APR tool maintains electrical connections between various cells of a circuit schematic diagram, when the placement of the cells in a layout is adjusted for manufacturing purposes. In some embodiments, the APR tool includes storage capability to store cell placement and storage rules.

Returning to FIG. 1, in operation 106 a circuit schematic diagram is developed. The circuit schematic diagram includes cells configured to perform desired functions and electrical connections between various cells and features. In some embodiments, a circuit designer designs the circuit schematic diagram. In some embodiments, the circuit schematic diagram is generated using a computer running a computer program such as a computer aided design (CAD) program or other suitable programs.

In operation 108, a circuit layout diagram is developed. The circuit layout diagram includes the location of the cells to be formed on a wafer or substrate. The circuit layout diagram includes the cells and connections defined by the circuit schematic diagram. In some embodiments, the circuit layout diagram comprises a plurality of openings in a mask. The mask is used during lithographic etching or doping processes to form the circuit defined by the circuit schematic diagram. In some embodiments, converting the circuit schematic diagram to the circuit layout diagram is performed using a cell library and the APR tool. In some embodiments, the APR tool uses information stored in the cell library in combination with the cell placement rules of operation 206 to generate the circuit layout diagram. In some embodiments, the layout engineer places certain cells or groups of cells having related functions together to simplify the manufacturing process.

In operation 110, cells are grouped based on the threshold voltage of each cell using the cell placement rules. In some embodiments, the cell placement rules include the rules described above with respect to operation 206. In some embodiments, the cell placement rules include additional or different rules. In some embodiments, the layout engineer defines at least one cell placement rule. In some embodiments, the layout engineer defines the at least one cell placement rule based on specifications provided by a customer or the circuit designer.

In operation 112, threshold voltage compliant fillers are inserted into the circuit layout diagram. The threshold compliant fillers are inserted into the circuit layout diagram to allow sufficient dimensions for precise manufacturing of the circuit layout diagram. In some embodiments, the fillers include blank spaces which do not include functional elements. In some embodiments, the fillers include dummy cells which are not used during operation of the circuit. In some embodiments, the fillers include spare cells which are usable to replace defective or worn out cells in the circuit. In some embodiments, the fillers include decoupling cells configured to improve a power integrity of the circuit.

Figure 3:
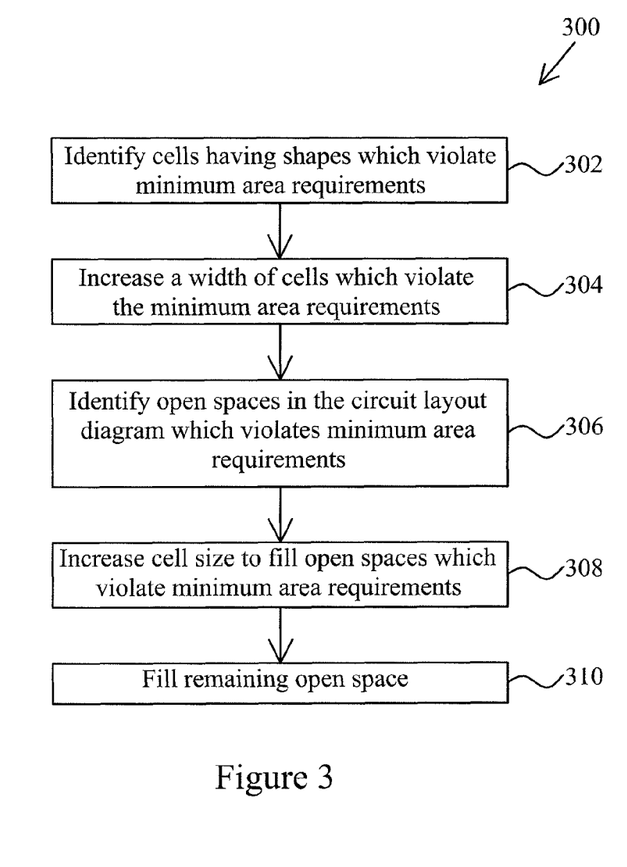
FIG. 3 is a flowchart method of inserting threshold voltage compliant fillers into a layout, in accordance with one or more embodiments.

FIG. 3 is a flowchart of a method 300 of inserting threshold voltage compliant fillers, in accordance with one or more embodiments. Operation 302 includes identifying cells having shapes which violate minimum area requirements. Despite satisfying all placement rules from operation 206 in the formation of the circuit layout diagram in operation 108, cells with small implant shapes need to be complemented by fillers of the same Vt implant type. Placement rules guarantee that spaces next to these small implant shapes are sufficiently large for filler insertion that adequately expands these small implant shapes to satisfy the minimum area requirements. Operation 302 is performed by analyzing an entire area of the circuit layout diagram to determine which, if any, cells are violate the minimum area requirements.

In operation 304, a width of cells which violate the minimum area requirements is increased. In some embodiments, operation 304 includes determining threshold voltages of cells adjacent to the identified cells. The threshold voltages of the adjacent cells are determined based on the individual cell layouts. A threshold compliant filler cell is formed adjacent the identified cell, so that a combined width of the filler cell and the identified cell is equal to or greater than the minimum value. The combined width of the filler cell and identified cell is capable of being formed by a lithography process, whereas the identified cell alone is smaller than a smallest dimension reliably formed by the lithography process.

The threshold voltage compliant fillers are determined based on the results of operation 302. For example, the distance between the small cell and large cell from above is filled with a filler having the first threshold voltage.

In operation 306, open space in the circuit layout diagram which violates the minimum area requirements is identified. Open space is the space not occupied by either a cell or a threshold voltage compliant filler cell. Open spaces which have a width less than the minimum value violate the minimum area requirements.

In operation 308, cell size is increased to fill the open spaces which violate the minimum area requirements. In some embodiments, the cell being increased is a functional cell. In some embodiments, the cell being increased is a threshold voltage compliant filler cell. In a similar manner as in operation 304, a width of the cell is increased to fill the identified open space, so that the combined width of the identified open space and the cell is greater than or equal to the minimum value.

In operation 310, remaining open space is filled. Open spaces which do not violate the minimum area requirements are similar to large cells in that the open spaces have a width greater than the smallest dimension reliably formed by the lithography process. In some embodiments, any open space which does not violate the minimum area requirements is filled with a single type of threshold voltage compliant filler. In some embodiments, open space which does not violate the minimum area requirements is filled with two or more types of threshold voltage compliant fillers. The threshold voltage compliant fillers are added to the circuit layout diagram to allow the circuit layout diagram to be precisely manufactured to form a functioning circuit. In some embodiments, the threshold voltage compliant fillers account for 20% to 30% of an entire area of the circuit layout diagram.

The above methods describe operations for forming a layout including cells having different threshold voltages. Those of ordinary skill in the art will recognize the described operations can be performed in a different order and steps can be added or removed. In some embodiments, additional operations include clock tree synthesis, signal routing, floor plan designing, combinations thereof or other suitable operations.

Figure 4A:
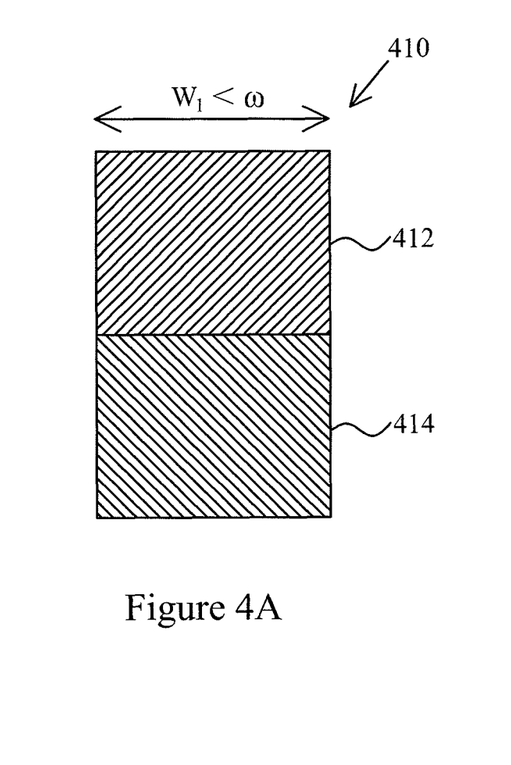
FIGS. 4A-4C are schematic views of different types of cells, in accordance with one or more embodiments.
Figure 4B:
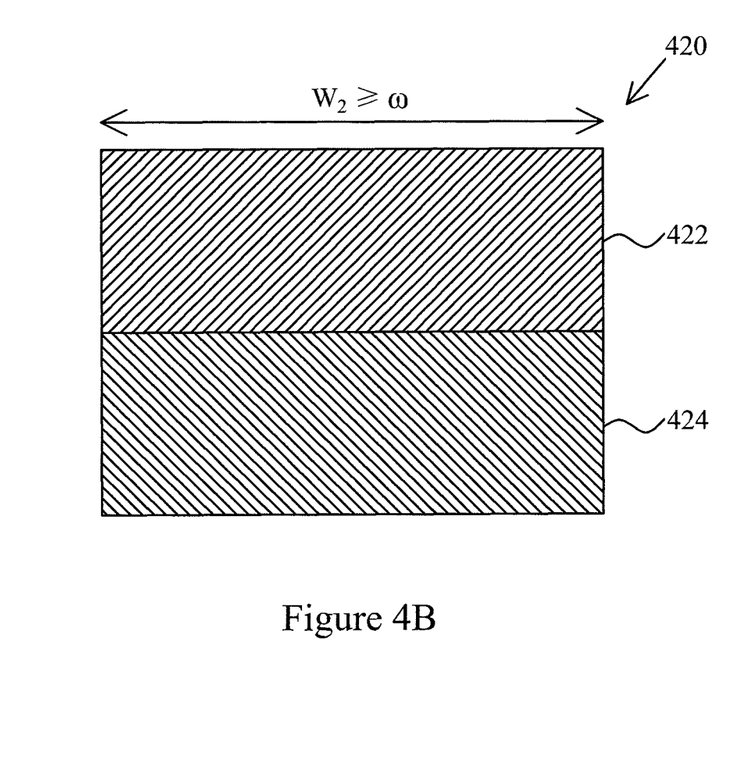
Figure 4C:
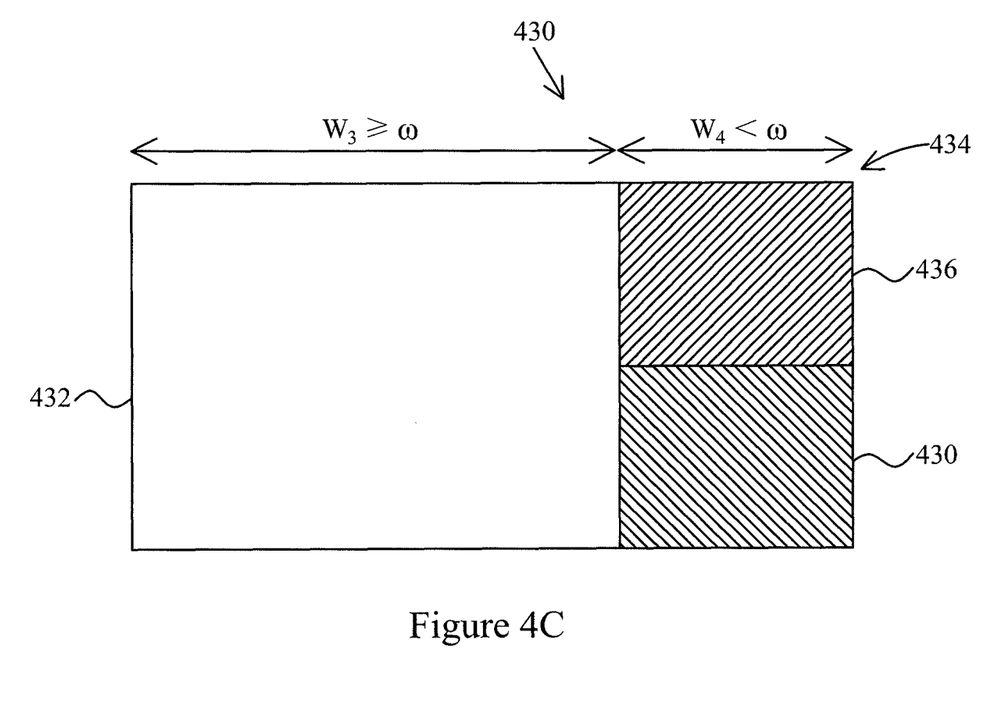

Implementation of the methods described above will now be explained by way of several examples. FIGS. 4A-4C are schematic views of different types cells, in accordance with one or more embodiments. FIG. 4A is a schematic view of a small cell 410. Small cell 410 has a width $W_1$ less than a minimum value $\omega$. Small cell 410 includes a first portion 412 doped with a first dopant type, e.g., n-type dopant, and a second portion 414 having a second dopant type, e.g., p-type dopant. The different dopant types allow features such as complementary metal-oxide-semiconductor (CMOS) transistors to be formed in small cell 410.

FIG. 4B is a schematic view of a large cell 420. Large cell 420 has a width $W_2$ greater than or equal to minimum value $\omega$. Large cell 420 includes a first portion 422 doped with the first dopant type, e.g., n-type dopant, and a second portion 424 having the second dopant type, e.g., p-type dopant.

FIG. 4C is a schematic view of a discontinuous cell 430. A discontinuous cell has regions which are not homogeneous across an entire cell width. In some embodiments, one portion of the discontinuous cell has a higher doping concentration than other portions. In some embodiments, one portion of the discontinuous cell has a different threshold voltage than other portions of the discontinuous cell. Discontinuous cell 430 includes a first region 432 having a width $W_3$ greater than or equal to minimum value $\omega$. First region 432 does not create cell spacing concerns because width $W_3$ is sufficiently large to allow a precise manufacturing. Discontinuous cell 430 includes a second region 434 having a width W4 less than minimum value $\omega$. Second region 434 includes a first portion 436 doped with the first dopant type, e.g., n-type dopant, and a second portion 438 having the second dopant type, e.g., p-type dopant. During implementation of cell placement and spacing rules, second portion 434 will be treated as a small cell from a right hand side and as a large cell from the left hand side.

Discontinuous cell 430 is called a right side discontinuous cell because second region 434 which has width $W_4$ less than minimum value $\omega$ is on the right-hand side of the discontinuous cell. One of ordinary skill in the art will recognize that this description also applies to left side discontinuous cells and discontinuous cells which have discontinuous regions on both sides of the discontinuous cell.

FIGS. 5A-8B are used to show examples of implementing method 100, according to some embodiments. FIGS. 5A-8B describe layouts which include cells similar to small cell 410, large cell 420 and discontinuous cell 430.

Figure 5A:
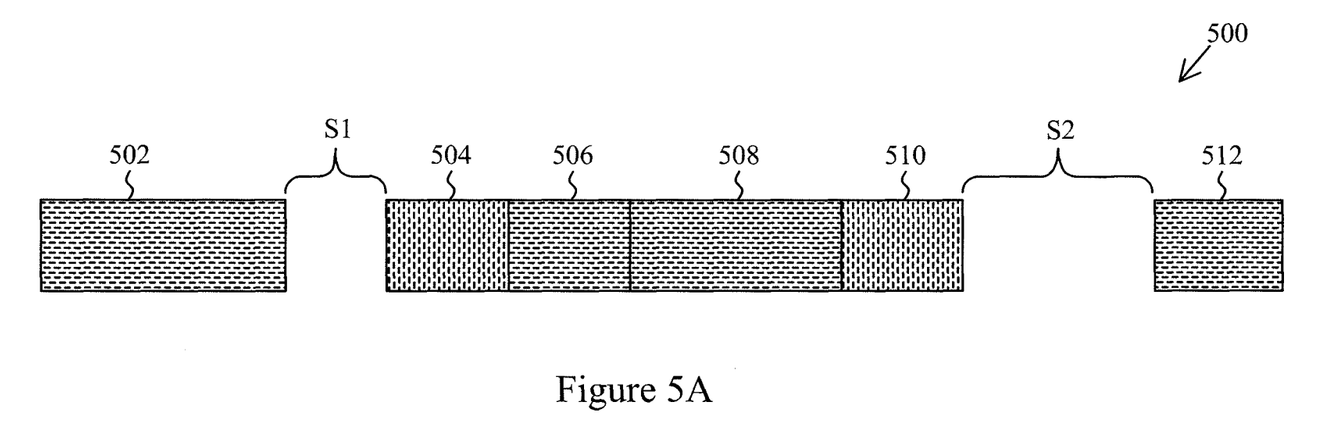
FIGS. 5A and 5B are schematic views of layouts formed by the method of FIG. 1, in accordance with one or more embodiments.

FIG. 5A is schematic view of a layout 500, in accordance with one or more embodiments. From left to right in FIG. 5A, layout 500 includes a large cell 502 having a first threshold voltage; a small cell 504 having a second threshold voltage, different from the first threshold voltage; a small cell 506 having the first threshold voltage; a large cell 508 having the first threshold voltage; a small cell 510 having the second threshold voltage and a small cell 512 having the first threshold voltage. The cell placement and spacing rules were generated to provide a space S1 greater than minimum value $\omega$ minus a width a small cell between the small cell and a large cell having different threshold voltages. The cell placement and spacing rules were generated to provide a space S2 greater than two times minimum value $\omega$ minus a width of the two small cells between small cells having different threshold voltages.

Figure 5B:
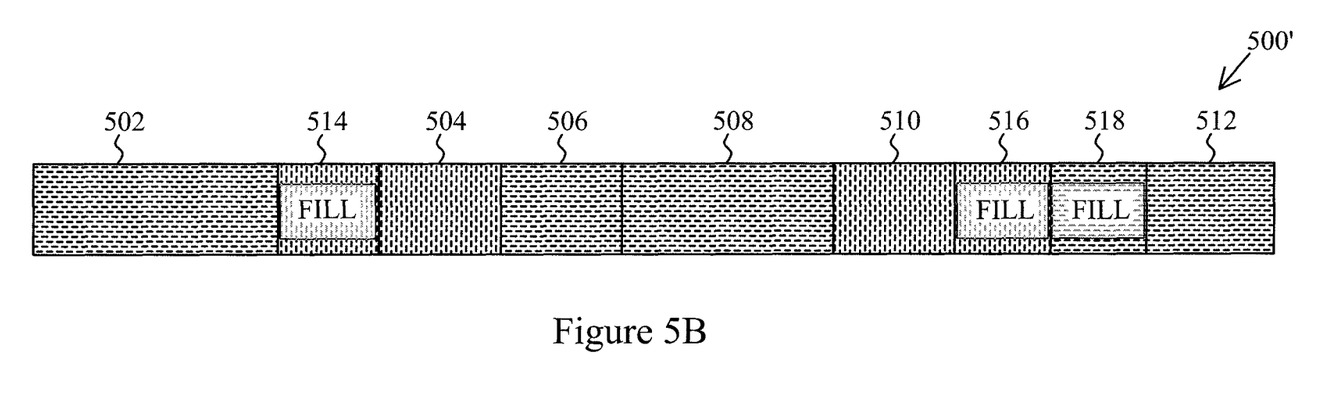

Threshold voltage compliant fillers are inserted into layout 500 to increase a size of each threshold voltage region to a size sufficient to allow precise manufacturing. FIG. 5B is schematic view of a layout 500', in accordance with one or more embodiments. Layout 500' is similar to layout 500, except layout 500' includes threshold voltage compliant fillers. A filler 514 is formed between large cell 502 and small cell 504. Filler 514 has the second threshold voltage in order to increase the size of the threshold voltage region of small cell 504. The cell placement and spacing rules combined with the insertion of filler 514 enables precise manufacturing of small cell 504 because a combined width of the small cell and the filler is greater than or equal to minimum value $\omega$.

Fillers 516 and 518 are formed between small cell 510 and small cell 512. Filler 516 has the second threshold voltage in order to increase the size of the threshold voltage region of small cell 510. A combined width of filler 516 and small cell 510 is greater than or equal to minimum value $\omega$. Filler 518 has the first threshold voltage in order to increase the size of the threshold voltage region of small cell 512. A combined width of filler 518 and small cell 512 is greater than or equal to minimum value $\omega$. The space between small cell 510 and small cell 512 is two times minimum value $\omega$ to allow insertion of two fillers having different threshold voltages within the space.

Layout 500' does not include a filler between small cell 506 and large cell 508 because the small cell and the large cell have a same threshold voltage. The combined width of small cell 506 and large cell 508 is greater than minimum value $\omega$ because the large cell alone has a width greater than or equal to the minimum value.

Figure 6A:
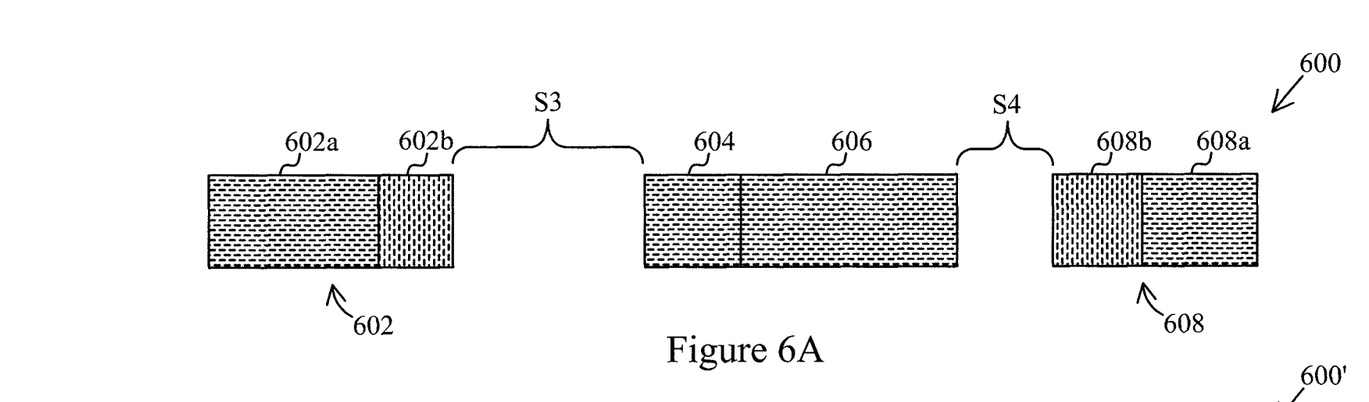
FIGS. 6A and 6B are schematic views of layouts formed by the method of FIG. 1, in accordance with one or more embodiments.

FIG. 6A is schematic view of a layout 600, in accordance with one or more embodiments. From left to right, layout 600 includes a discontinuous cell 602 have a first region 602a having the first threshold voltage type and a second region 602b having the second threshold voltage type; a small cell 604 having the first threshold voltage type; a large cell 606 having the first threshold voltage type; and a discontinuous cell 608 having a first region 608 having the first threshold voltage type and a second region having the second threshold voltage type. Second region 602b and second region 608b are treated similar to small cells, so a space S3 between second region 602b and small cell 604 is at least two times minimum value $\omega$ minus a width of second region 602b and a width of small cell 604, and a space S4 between second region 608b and large cell 606 is greater than or equal to the minimum value minus a width of second region 608b.

Figure 6B:
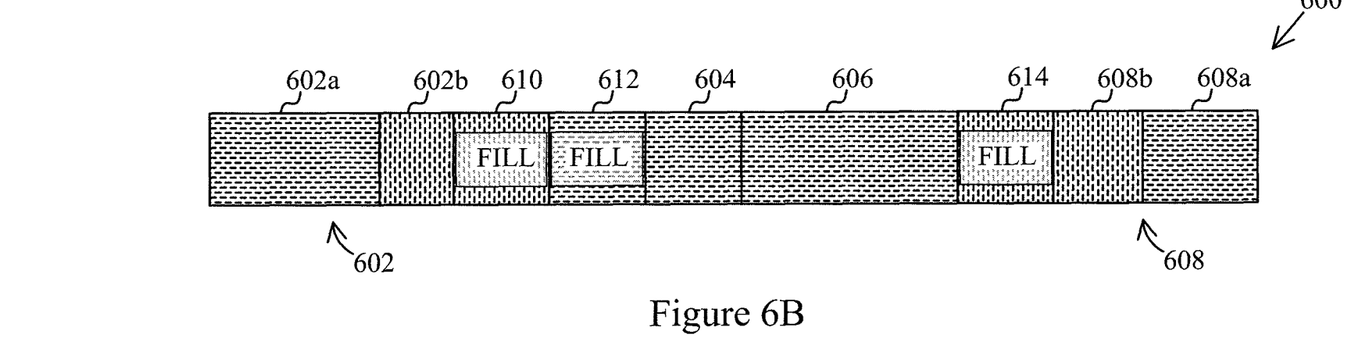

Threshold voltage compliant fillers are inserted into layout 600 to increase a size of each threshold voltage region to a size sufficient to allow precise manufacturing. FIG. 6B is schematic view of a layout 600', in accordance with one or more embodiments. Layout 600' is similar to layout 600, except layout 600' includes threshold voltage compliant fillers. Fillers 610 and 612 are formed between second region 602b and small cell 604. Filler 610 has the second threshold voltage in order to increase the size of the threshold voltage region of second region 602b. A combined width of filler 610 and second region 602b is greater than or equal to minimum value $\omega$. Filler 612 has the first threshold voltage in order to increase the size of the threshold voltage region of small cell 604. A combined width of filler 612 and small cell 604 is greater than or equal to minimum value $\omega$.

A filler 614 is formed between large cell 606 and second region 608b. Filler 614 has the second threshold voltage in order to increase the size of the threshold voltage region of second region 608b. The cell placement and spacing rules combined with the insertion of filler 614 enables precise manufacturing of second region 608b because a combined width of the second region and the filler is greater than or equal to minimum value $\omega$.

Figures 7A, 7B:
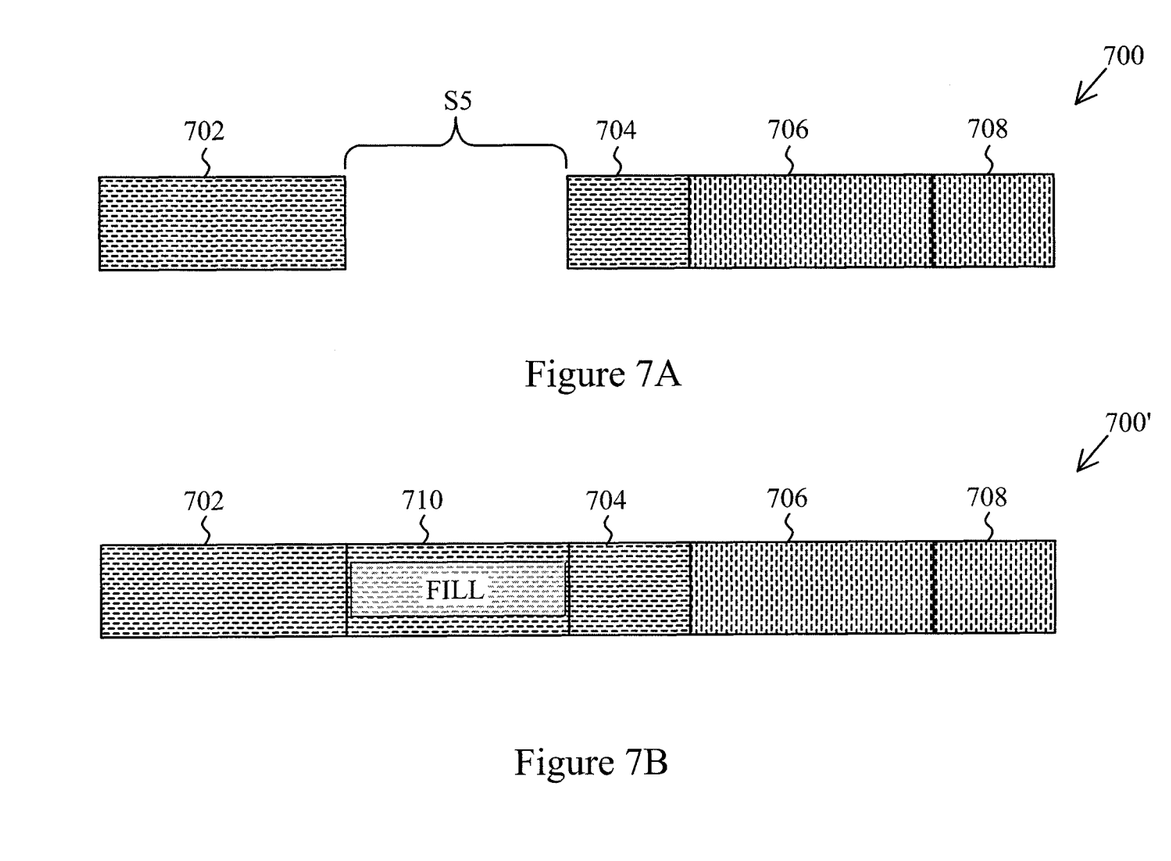
FIGS. 7A and 7B are schematic views of layouts formed by the method of FIG. 1, in accordance with one or more embodiments.

FIG. 7A is schematic view of a layout 700, in accordance with one or more embodiments. From left to right, layout 700 includes a large cell 702 having the first threshold voltage; a small cell 704 having the first threshold voltage; a large cell 706 having the second threshold voltage; and a small cell 708 having the second threshold voltage. A space S5 between large cell 702 and small cell 704 has a width of three times the minimum value $\omega$. The width of three times minimum value $\omega$ is merely an example, one of ordinary skill in the art would recognize the width of the space between large cell 702 and small cell 704 can be greater or less than $3\omega$, or can be omitted completely. In some embodiments, the space between large cell 702 and small cell 704 is defined by the layout engineer. In some embodiments, the space between large cell 702 is a result of reducing path lengths for variable signal lines or other design concerns.

A threshold voltage compliant filler is inserted into layout 700 to increase a size of each threshold voltage region to a size sufficient to allow precise manufacturing. FIG. 7B is schematic view of a layout 700', in accordance with one or more embodiments. Layout 700' is similar to layout 700, except layout 700' includes the threshold voltage compliant filler. A filler 710 is formed between large cell 702 and small cell 704. Filler 710 has the first threshold voltage in order to increase the size of the threshold voltage region of small cell 704. The cell placement and spacing rules combined with the insertion of filler 710 enables precise manufacturing of small cell 704 because a combined width of the small cell and the filler is greater than or equal to minimum value ω.

Figure 8A:
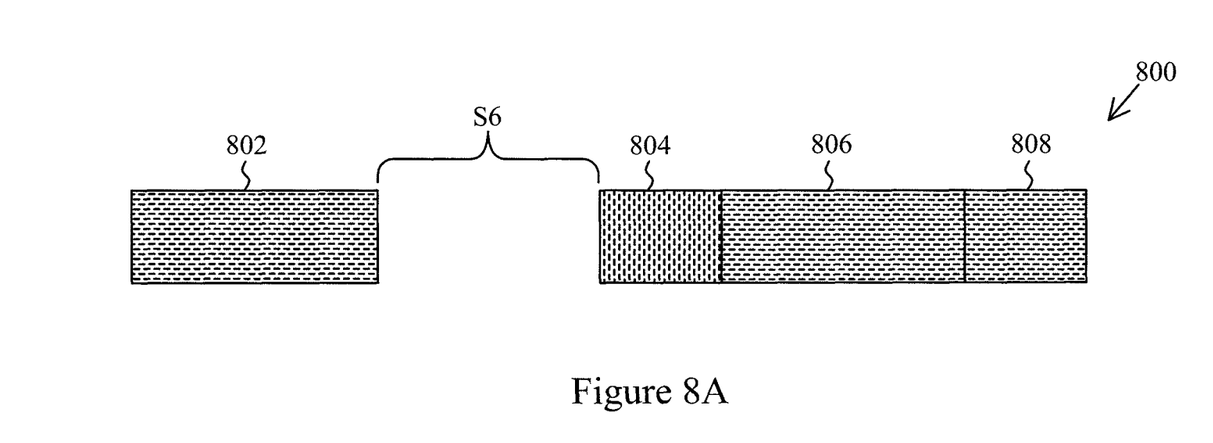
FIGS. 8A and 8B are schematic views of layouts formed by the method of FIG. 1, in accordance with one or more embodiments.

FIG. 8A is schematic view of a layout 800, in accordance with one or more embodiments. From left to right, layout 800 includes a large cell 802 having the first threshold voltage; a small cell 804 having the second threshold voltage; a large cell 806 having the second threshold voltage; and a small cell 808 having the second threshold voltage. A space S6 between large cell 802 and small cell 804 has a width of three times the minimum value ω. The width of three times minimum value ω is merely an example, one of ordinary skill in the art would recognize the width of the space between large cell 702 and small cell 704 can be greater or less than 3ω.

Figure 8B:
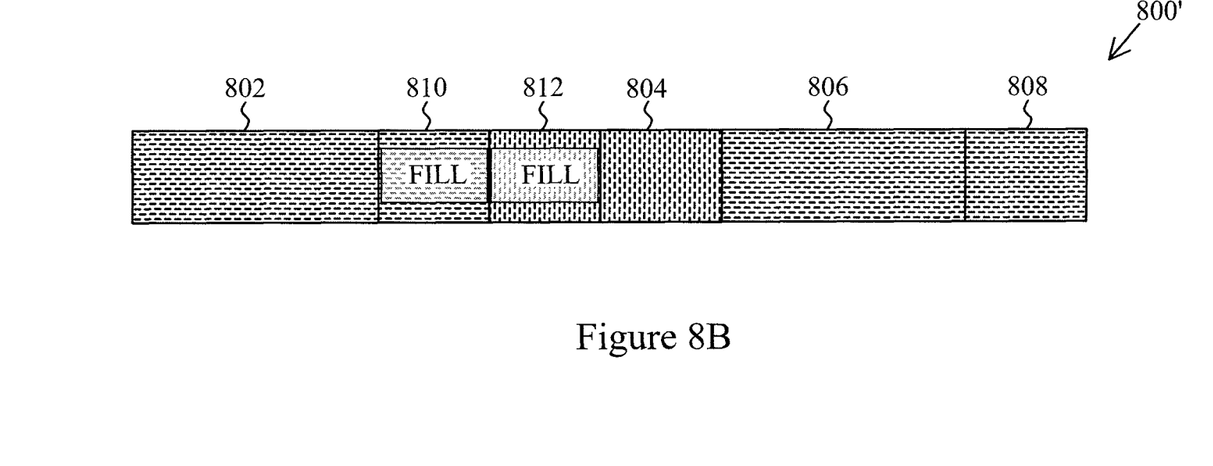

Threshold voltage compliant fillers are inserted into layout 800 to increase a size of each threshold voltage region to a size sufficient to allow precise manufacturing. FIG. 8B is schematic view of a layout 800', in accordance with one or more embodiments. Layout 800' is similar to layout 800, except layout 800' includes threshold voltage compliant fillers. Fillers 810 and 812 are formed between large cell 802 and small cell 804. Filler 810 has the first threshold voltage. Filler 812 has the second threshold voltage in order to increase the size of the threshold voltage region of small cell 804. The cell placement and spacing rules combined with the insertion of filler 812 enables precise manufacturing of small cell 804 because a combined width of the small cell and the filler is greater than or equal to minimum value ω.

So long as the combined width of filler 812 and small cell 804 is greater than or equal to the minimum value w, filler 810 can be used to create a back-up cell or a decoupling cell having the first threshold voltage to increase the power integrity of the circuit. The selection of the type of filler 810 will depend on the design of the circuit and is determined by the layout engineer or the circuit designer, in some embodiments.

The examples provided in FIGS. 5A-8B use only two threshold voltages for simplicity. One of ordinary skill in the art will recognize more than two different threshold voltages are within the scope of this description. The Examples of FIGS. 5A-8B are only directed to one dimensional spacing for simplicity. One of ordinary skill in the art will recognize each layer of a layout is includes two-dimensional spacing and the cell placement and spacing rules as well as filler cell insertion for greater than one-dimension are within the scope of this description.

Figure 9:
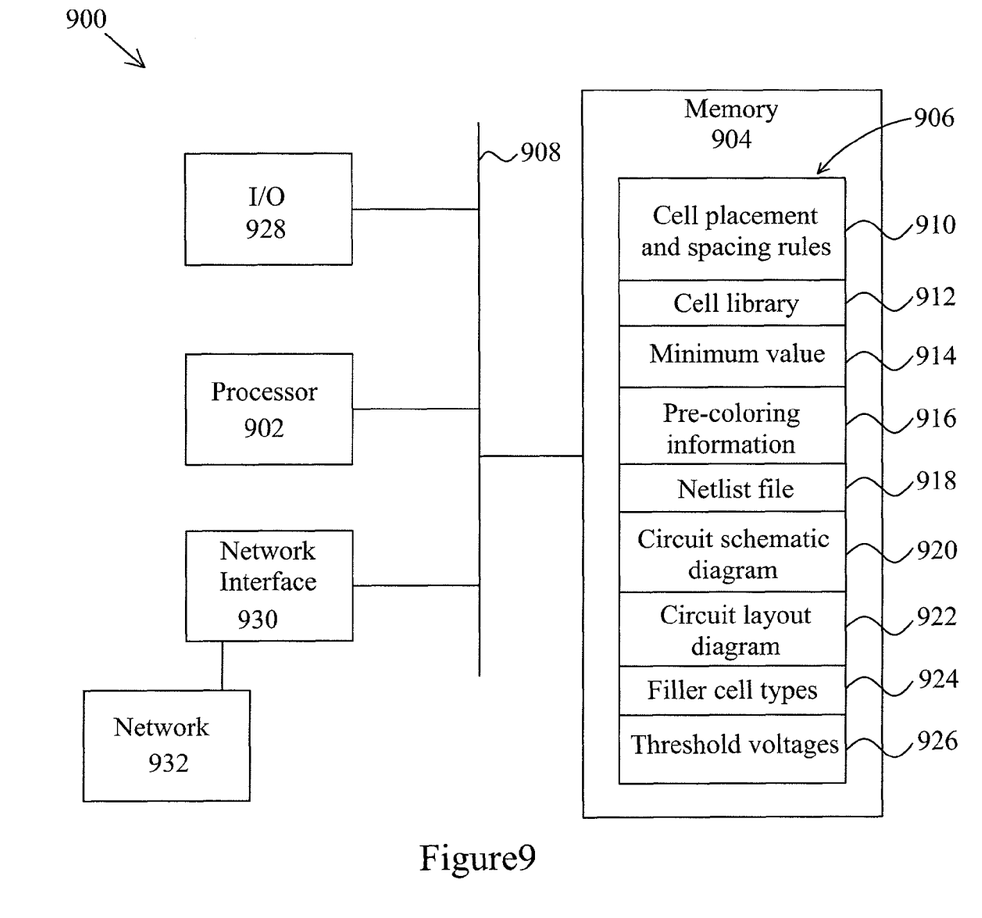
FIG. 9 is a block diagram of a system for implementing the method of FIGS. 1-3, in accordance with one or more embodiments.

FIG. 9 is a block diagram of a system 900 usable for implementing the method disclosed in FIGS. 1-3, in accordance with one or more embodiments. System 900 includes a hardware processor 902 and a non-transitory, computer readable storage medium 904 encoded with, i.e., storing, the computer program code 906, i.e., a set of executable instructions. The processor 902 is electrically coupled to the computer readable storage medium 904 via a bus 908. The processor 902 is configured to execute the computer program code 906 encoded in the computer readable storage medium 904 in order to cause system 900 to be usable for performing a portion or all of the operations as depicted in FIGS. 1-3.

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 820 includes a compact disk-read only memory (CD-ROM), a compact disk-read/write (CD-R/W), and/or a digital video disc (DVD).

In some embodiments, the storage medium 904 stores the computer program code 906 configured to cause system 900 to perform a method as depicted in FIGS. 1-3. In some embodiments, the storage medium 904 also stores information needed for performing method 100, 200 and/or 300 or generated during performing the methods, such as cell placement and spacing rules 310, cell library 312, spacing parameter 314, pre-coloring information 316, netlist file 318, circuit schematic diagram 320, circuit layout diagram 322, filler cell types 324, threshold voltages 326, and/or a set of executable instructions to perform the operation of FIGS. 1-3.

System 900 includes, in at least some embodiments, an input/output interface 928. The input/output interface 928 is coupled to external circuitry.

In at least some embodiments, system 900 also includes a network interface 930 coupled to the processor 902. The network interface 930 allows system 900 to communicate with a network 932, to which one or more other computer systems are connected. Network interface 930 includes wireless network interfaces such as BLUETOOTH, WIFI, WIMAX, GPRS, or WCDMA; or wired network interface such as ETHERNET, USB, or IEEE-1394. In some embodiments, the method of FIGS. 1-3 are implemented in two or more system, and information such as cell placement and spacing rules, cell library, spacing parameter, pre-coloring information, netlist file, circuit schematic diagram, circuit layout diagram, filler cell types and/or threshold voltages are exchanged between different systems 900 via the network 932.

System 900 is configured to receive information related to a type of process through I/O 928. The information is transferred to processor 902 via bus 908 to determine cell placement and spacing rules for the type of process. The cell placement and spacing rules are then stored in memory 904 as cell placement and spacing rules 910. The information is transferred to processor 902 via bus 908 to determine a cell library for the type of process. The cell library is then stored in memory 904 as cell library 912. The information is transferred to processor 902 via bus 908 to determine a spacing parameter for the type of process. The spacing parameter is then stored in memory 904 as minimum value 914. The information is transferred to processor 902 via bus 908 to determine pre-coloring information for the type of process. The pre-coloring information is then stored in memory 904 as pre-coloring information 916. The information is transferred to processor 902 via bus 908 to determine a netlist file for the type of process. The netlist file is then stored in memory 904 as netlist file 918. The information is transferred to processor 902 via bus 908 to determine a circuit schematic diagram for the type of process. The circuit schematic diagram is then stored in memory 904 as circuit schematic diagram 920. The information is transferred to processor 902 via bus 908 to determine a circuit layout diagram for the type of process. The circuit layout diagram is then stored in memory 904 as circuit layout diagram 922. The information is transferred to processor 902 via bus 908 to determine filler cell types for the type of process. The filler cell types are then stored in memory 904 as filler cell types 924. The information is transferred to processor 902 via bus 908 to determine threshold voltages for the type of process. The threshold voltages are then stored in memory 904 as threshold voltages 926.

In some embodiments, during operation, processor 902 generates circuit layout diagram 922 based on cell placement and spacing rules 910, cell library 912, minimum value 914, pre-coloring information 916, netlist file 918 and/or circuit schematic diagram 920.

In some embodiments, during operation, processor 902 executes a set of instructions to compare circuit layout diagram 922 to minimum value 914 and threshold voltages 926. If the comparison indicates a spacing between adjacent cells of circuit layout diagram 922 is less than minimum value 914 and the adjacent cells have different threshold voltages 926, processor 902 inserts a filler from filler types 924 into the circuit layout diagram.

The above method and system provide advantages over other approaches in that the method and system provide a method of forming functional circuits which have cell sizes less than a dimension reliably formed by a lithography process. Lithography processes have a minimum implant mask dimension, below which features cannot reliably be formed. The above described method and system use minimum area requirements and placement rules to increase a size of implant areas in a circuit to be equal to or greater than the minimum implant mask dimension. As a result, circuits formed using the above described method and system are reliably formed at sizes below the minimum implant mask dimension.

One aspect of this description relates to a method of forming a layout. The method includes developing a circuit schematic diagram, the circuit schematic diagram including a plurality of cells. The method further includes generating cell placement rules for the plurality of cells based on the circuit schematic diagram and developing a circuit layout diagram for the plurality of cells based on the cell placement rules. The method further includes grouping the plurality of cells of the circuit layout diagram based on threshold voltages and inserting threshold voltage compliant fillers into the circuit layout diagram.

Another aspect of this description relates to a system for forming a layout. The system includes a memory configured to store data and a processor connected to the memory. The processor configured to develop a circuit schematic diagram including a plurality of cells and generate cell placement rules for the plurality of cells based on the circuit schematic diagram. The processor further configured to develop a circuit layout diagram for the plurality of cells based on the cell placement rules and group the plurality of cells of the circuit layout diagram based on threshold voltages. The processor further configured to insert threshold voltage compliant fillers into the circuit layout diagram.

Still another aspect of this description relates to a circuit layout. The circuit layout includes a first small cell having a width less than a minimum value, the first small cell having a first threshold voltage. The circuit layout further includes a second cell having a second threshold voltage different from the first threshold voltage, the second cell separated from the first small cell by a distance greater than or equal to the minimum value. The circuit layout further includes at least one filler disposed between the first small cell and the second cell, the at least one filler having the first threshold voltage or the second threshold voltage.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of forming a layout, the method comprising:
developing a circuit schematic diagram, using a computer, the circuit schematic diagram including a plurality of cells;
generating cell placement rules for the plurality of cells based on the circuit schematic diagram;
developing a circuit layout diagram for the plurality of cells based on the cell placement rules;
grouping the cells of the plurality of cells of the circuit layout diagram into groups of two or more cells having a same threshold voltage based on threshold voltages of the cells of the plurality of cells;
identifying if any cells of the groups of cells violate a minimum area requirement;
identifying if any open spaces between the cells violate the minimum area requirement; and
inserting a threshold voltage compliant filler into the identified open spaces between the identified cells which violate the minimum area requirement of the circuit layout diagram.

2. The method of claim 1, wherein generating cell placement rules comprises:
analyzing a cell width for the cells of the plurality of cells;
grouping the plurality of cells based on cell size and circuit type; and
defining minimum area requirements between cells of the plurality of cells based on cell size and threshold voltage.

3. The method of claim 2, wherein analyzing the cell width comprises comparing the cells of the plurality of cells to a minimum value.

4. The method of claim 1, wherein inserting threshold voltage compliant fillers comprises:
inserting at least one of a dummy cell, a replacement cell, a decoupling cell or an open area.

5. The method of claim 1, wherein inserting the threshold voltage compliant filler comprises:
increasing a width of the identified cells;
increasing a width of at least one cell adjacent the identified open spaces; and
filling remaining open spaces with at least one threshold voltage dopant.

6. The method of claim 5, wherein increasing the width of the identified cell comprises matching the threshold voltage of the threshold compliant filler to the threshold voltage of at least one of the adjacent cells of the plurality of cells.

7. The method of claim 5, wherein filling the remaining open spaces comprises filling the remaining open spaces with a single threshold voltage dopant.

8. The method of claim 1, wherein developing the circuit layout diagram comprises converting the circuit schematic diagram using a cell library.

9. A system for forming a layout, the system comprising:
a memory configured to store data; and a processor connected to the memory, the processor configured to:
- develop a circuit schematic diagram including a plurality of cells;
- generate cell placement rules for the plurality of cells based on the circuit schematic diagram;
- develop a circuit layout diagram for the plurality of cells based on the cell placement rules;
- group the cells of the plurality of cells of the circuit layout diagram into groups of two or more cells having a same threshold voltage based on threshold voltages of the cells of the plurality of cells;
- identify if any cells of the groups of cells violate a minimum area requirement;
- identify if any open spaces between the cells violate the minimum area requirement; and
- insert threshold voltage compliant fillers into the identified open spaces between the identified cells which violate the minimum area requirement of the circuit layout diagram.

10. The system of claim 9, wherein the processor is further configured to:
- analyze a cell width and a threshold voltage for each of the plurality of cells;
- group the plurality of cells based on cell size and circuit type; and
- define a minimum area requirement between cells of the plurality of cells based on cell size and threshold voltage.

11. The system of claim 10, wherein the processor is configured to determine the cell size using a comparison between the cells of the plurality of cells and a minimum value.

12. The system of claim 9, wherein the processor is further configured to:
- increase a width of the identified cells;
- increase a width of at least one cell adjacent the identified open spaces; and
- fill remaining open spaces with at least one threshold voltage dopant.

13. The system of claim 12, wherein the processor is configured to match the threshold voltage of the threshold compliant filler to the threshold voltage of at least one of the adjacent cells of the plurality of cells.

14. The system of claim 12, wherein the processor is configured to fill the remaining open spaces with a single threshold voltage dopant.

15. The system of claim 14, wherein the processor is configured to convert the circuit schematic diagram to the circuit layout diagram using a cell library.

16. A method of inserting a threshold voltage compliant filler into a circuit layout diagram, the method comprising:
- identifying, by a processor, a first small cell having a first width less than a minimum value, the first small cell having a first threshold voltage;
- identifying a second cell having a second threshold voltage different from the first threshold voltage, the second cell separated from the first small cell by a distance;
- identifying an open space between the first small cell and the second cell which violates a defined minimum area requirement;
- increasing a width of at least one of the first small cell or the second cell adjacent the identified open space by filling at least some of the identified open space with at least one filler disposed between the first small cell and the second cell, the at least one filler having the first threshold voltage or the second threshold voltage.

17. The method of claim 16, wherein the second cell is a second small cell having a second width less than the minimum value, the distance is equal to or greater than twice the minimum value minus the first width and the second width, and
- filling at least some of the identified open space comprises:
  - filling an identified opening adjacent to the first small cell with a first filler, the first filler having the first threshold voltage, and a total width of the first filler and the first width is greater than or equal to the minimum value; and
  - filling another identified opening adjacent to the second small cell with a second filler, the second filler having the second threshold voltage, and a total width of the second filler and the second width is greater than or equal to the minimum value.

18. The method of claim 16, wherein the second cell is a large cell having a second width greater than or equal to the minimum value, and
- filling at least some of the identified open space comprises:
  - filling an identified opening adjacent to the first small cell with a first filler, the first filler having the first threshold voltage, and a total width of the first filler and the first width is greater than or equal to the minimum value.

19. The method of claim 16, further comprising:
- identifying a first large cell having a second width greater than or equal to a minimum value, the first large cell having the first threshold voltage and being separated from the first small cell by a distance between the first large cell and the first small cell that is less than the minimum value.

20. The method of claim 16, wherein the at least one filler comprises at least one of a dummy cell, a replacement cell, a decoupling cell or an open area.

* * * * *